(12) United States Patent
Luo et al.

(10) Patent No.: US 7,813,390 B2
(45) Date of Patent: Oct. 12, 2010

(54) INJECTION-SEEDED MONOLITHIC LASER

(75) Inventors: Ningyi Luo, Fremont, CA (US);
Sheng-Bai Zhu, Fremont, CA (US)

(73) Assignee: Pavilion Integration Corporation, San Jose, CA (US)

( * ) Notice: Subject to any disclaimer, the term of this patent is extended or adjusted under 35 U.S.C. 154(b) by 394 days.

(21) Appl. No.: 11/846,681

(22) Filed: Aug. 29, 2007

(65) Prior Publication Data

US 2009/0059968 A1 Mar. 5, 2009

(51) Int. Cl.
*H01S 3/13* (2006.01)
(52) U.S. Cl. ............................................. 372/32; 372/6
(58) Field of Classification Search ................... 372/32, 372/6
See application file for complete search history.

(56) References Cited

U.S. PATENT DOCUMENTS

| | | | |
|---|---|---|---|
| 4,578,793 A | 3/1986 | Kane et al. | |
| 4,583,228 A | 4/1986 | Brown et al. | |
| 4,747,111 A | 5/1988 | Trutna, Jr. et al. | |
| 4,791,633 A | 12/1988 | Esherick et al. | |
| 4,955,034 A | 9/1990 | Scerbak | |
| 5,027,360 A | 6/1991 | Nabors et al. | |
| 5,027,367 A | 6/1991 | Rea, Jr. et al. | |
| 5,043,996 A | 8/1991 | Nilsson et al. | |
| 5,052,815 A | 10/1991 | Nightingale et al. | |
| 5,521,930 A | 5/1996 | Suni et al. | |
| 5,619,517 A | 4/1997 | Dixon | |
| 5,809,048 A | 9/1998 | Shichijyo et al. | |
| 5,880,877 A * | 3/1999 | Fermann et al. | 359/341.31 |
| 5,909,306 A | 6/1999 | Goldberg et al. | |
| 5,999,673 A | 12/1999 | Valentin et al. | |
| 6,002,704 A | 12/1999 | Freitag et al. | |
| 6,081,369 A | 6/2000 | Waarts et al. | |
| 6,282,226 B1 | 8/2001 | Furukawa | |
| 6,393,037 B1 | 5/2002 | Basting et al. | |
| 6,903,341 B2 | 6/2005 | Imai et al. | |
| 6,930,822 B2 | 8/2005 | Boggy et al. | |
| 6,973,254 B2 | 12/2005 | Kubota et al. | |
| 6,980,354 B1 | 12/2005 | Smith et al. | |
| 7,039,087 B2 | 5/2006 | Nettleton et al. | |
| 7,106,501 B2 | 9/2006 | Starodoumov et al. | |
| 2004/0233942 A1 | 11/2004 | Schlueter et al. | |
| 2005/0111500 A1* | 5/2005 | Harter et al. | 372/25 |
| 2006/0029111 A1* | 2/2006 | Liu | 372/6 |
| 2006/0120417 A1* | 6/2006 | Wang et al. | 372/30 |
| 2006/0133432 A1 | 6/2006 | Dragic | |
| 2006/0268950 A1 | 11/2006 | Kane | |

FOREIGN PATENT DOCUMENTS

WO WO/2005/053119 9/2005

* cited by examiner

*Primary Examiner*—Tod T Van Roy

(57) ABSTRACT

An injection seeding laser system in which the seeded laser has a monolithic structure without any moving parts. The seeder emits light whose wavelength is swept in a radio frequency (RF) over a range that covers one or more longitudinal mode(s) of the seeded laser, which eliminates the need for active cavity length control and phase locking between the injected and output signals. The gain medium of the seeded laser is an active medium whose population is substantially inversed in response to an excitation, which can be electrical or optical. Time synchronization between the injected seeds and the triggering signal to the slave is generally not required. The present invention enables fiber MOPO that produces high power laser pulses in an efficient and cost-effective manner.

1 Claim, 10 Drawing Sheets

INJECTION-SEEDED MONOLITHIC LASER

FIELD OF THE INVENTION

This invention relates in general to injection seeding technique and in particular to monolithic high-power slave laser injection-seeded by a master.

In United States Patent Application No. 20060215714, Luo et al. invented a method and a device employing continuous wavelength sweeping for master-slave resonance to replace stringent cavity length control and phase locking in injection seeding. This invention greatly reduces system complications and cost, and paves the way for development of a user-friendly system, requiring minimum efforts of end-users in various applications.

BACKGROUND OF THE INVENTION

Many applications require high-power laser sources with short pulse duration, narrow spectral bandwidth, low intensity/phase noise, compact size, and low cost. A common technique to achieve narrow, e.g., Fourier transform limited, bandwidth of high power and low noise radiation is injection seeding. A basic requirement for effective injection seeding is that resonance between the slave modes and the photons from the master must be kept in every pulse. Conventionally, the master-slave resonance is based on stabilized wavelength of the seed laser (master), active control of the resonance wavelength or longitudinal modes of the seeded laser (slave), and locked phase angle between the injected and output signals.

One way to stabilize seed laser wavelength is by use of filtered optical feedback. As an example, in U.S. Pat. No. 5,809,048, Shichijyo et al. used an external wavelength sensitive optical device and a birefringent Lyot filter for improving the wavelength stability. Another way to accomplish the wavelength stabilization of a semiconductor laser was disclosed in U.S. Pat. No. 4,583,228, wherein the drive current and the laser temperature were controlled by feedback signals derived from an external Fabry-Perot interferometer. Alternatively, the wavelength reference can be located within the oscillator, as described in U.S. Pat. No. 6,930,822. Wavelength stabilization can also be accomplished by movement of an optical element, e.g., rotation of a prism inside the laser, together with a signal processor. An example of such systems is given in U.S. Pat. No. 6,393,037. Other means of wavelength stabilization includes adjusting the temperature or angular tilt or spacing of an intracavity etalon; or adjusting the angle of a prism, a grating, a mirror, or a birefringent filter; or adjustment of the cavity length.

Active control of the resonance wavelength or longitudinal modes of a seeded laser oscillator to match the injected wavelength within the necessary tolerance typically requires modifications of the oscillator cavity by mounting a piezoelectric transducer (PZT) or a magneto-electric device onto a mirror, which dithers according to the feedback signal generated from a control system. A practical implementation of such systems can be found in, e.g., Applied Optics 35 pp. 1999-2004 (1996).

In a Q-switched laser operation, triggering can be controlled to occur only when the interference of the seed light and the light that leaks out from a slave cavity mirror shows a maximum. This technique guarantees that Q-switch is triggered only when the slave cavity is in resonance with the seed laser. Pioneered by Fry and co-workers, this technique has a disadvantage, namely, the laser could fire at any time during the voltage ramp, consequently, synchronization with other events might be impossible.

This problem can be overcome by triggering the Q-switch at a predefined time after the start of the ramp. Before reaching this predefined time and once the resonance is detected, the ramp is stopped and the length of the slave cavity is held constant. This method guarantees that laser shot occurs at a fixed time. However, due to the need to hold the ramp, ramping times have to be reduced in order to avoid mechanical ringing in the system. An application of the ramp-hold-fire seeding technique to a Ti:sapphire laser is described in Applied Optics 40, pp. 3046-3050 (2001).

An alternative method for master-slave resonance is based on minimizing the build-up time of the laser radiation. Many commercial Nd:YAG systems use this technique. An obvious problem of this technique is that the direction of deviation from the optimum cavity length is not measurable and the feedback occurs in a random fashion. In practice, this technique only works reliably for a predefined and carefully optimized repetition rate, between 10 Hz and 100 Hz. Refer to, e.g., Applied Optics 25 pp. 629-633 (1986).

Conventional injection-seeding systems are inevitably complicated, expensive, and inconvenient in use. In addition, PZT- or magneto-electric device-mounted cavity mirrors have to be separated from the gain media, making monolithic structure of slave oscillators impossible.

SUMMARY OF THE INVENTION

It is therefore an object of the present invention to develop an injection-seeding system, which is compact, cost-effective, and ready for direct use. In particular, effective injection seeding of monolithic high-power lasers and monolithic microchip lasers is enabled.

Viewed from a first aspect, our invention enables monolithic structure of slave laser cavity, which can be linear, folded, or ring. For linear cavities, mirrors are end-surface coated and the laser gain medium performs all the functions of the conventional laser cavities. For ring cavities, one or more surface(s) provide total internal reflection, and at least one surface is dielectrically coated as input/output coupler. Optical elements such as polarizer, half-wave plate or equivalent, and Faraday rotator are all embodied in a single crystal or, for a composite laser cavity, in a single optical block comprising several crystals that are optically bonded to each other. The ring cavities can have a variety of specific configurations and can be planar or non-planar. The laser propagation in a ring cavity can be unidirectional or in two opposite directions.

Viewed from a second aspect, one or more nonlinear optical crystal(s) can be optically bonded onto the slave laser gain medium for nonlinear frequency conversion. With proper coating, dual color laser output can be achieved.

Viewed from a third aspect, electro-optic devices such as Pockels or Kerr cells, or acousto-optic devices or passive devices such as doped crystal characteristic of nonlinear transmission can be attached to the monolithic slave laser cavity for Q-switch or mode locking.

Viewed from a fourth aspect, other optical elements such as micro-lenses and power amplifier(s) can be attached to the monolithic slave laser cavity for additional features.

Viewed from a fifth aspect, the slave laser gain medium can be end-pumped by one or more laser diode(s) or other light source(s) including diode pumped solid-state laser(s) with or without wavelength conversion, or side-pumped by flash lamps, arc lamps, diode arrays, light emitting diode (LED) arrays, vertical cavity surface emitting laser (VCSEL) arrays, or any other light sources matching the absorption spectrum of the laser gain medium. For side-pumping configuration, a diffusion pump chamber is preferably incorporated.

Viewed from a sixth aspect, short pulse, high repetition rate laser operation can be achieved by gain switching mode. Neither moving parts nor external components are required.

Viewed from a seventh aspect, the master-slave resonance is accomplished by continuous wavelength sweeping rather than active control of the slave laser cavity length. The seed source can be a radio frequency (RF) modulated laser diode or other light sources producing stable laser output with rapidly varying wavelength over a range covering one or more longitudinal modes of the slave oscillator. The wavelength-sweeping optical seeds are injected into slave laser cavity through free-space coupling or fiber coupling.

Viewed from an eighth aspect, continuous wavelength sweeping is accomplished through periodic variation of the seed laser drive current, in particular, through an RF modulated drive current that produces optical seeds in pulsed or quasi-CW or CW mode. Due to the high frequency modulation, wavelength sweeping is rapid and essentially continuous, precise timing between the seeder and the pump pulse is generally not required. In some special applications, the RF modulated laser diode is further electrically or optically modulated with characteristics matching the desired laser output pulses.

Viewed from a ninth aspect, the slave oscillator can be an ordinary optical oscillator, a fiber laser, a Raman laser, an optical parametric oscillator (OPO), a master oscillator power amplifier (MOPA), or a master oscillator power oscillator (MOPO). High-power laser pulses can be efficiently generated from a fiber laser without complicated structure.

Viewed from a tenth aspect, the slave laser gain medium is not limited to solid-state and the means of activating the slave laser gain medium is not limited to optical energy.

The advantages and novel features of this invention will become more obvious from the detailed description below.

DETAILED DESCRIPTION OF THE PRESENT INVENTION

As will be described in more detail hereafter, there is disclosed herein an injection seeding laser system employing continuous wavelength sweeping for non-invasive master-slave resonance.

Figure 1A:
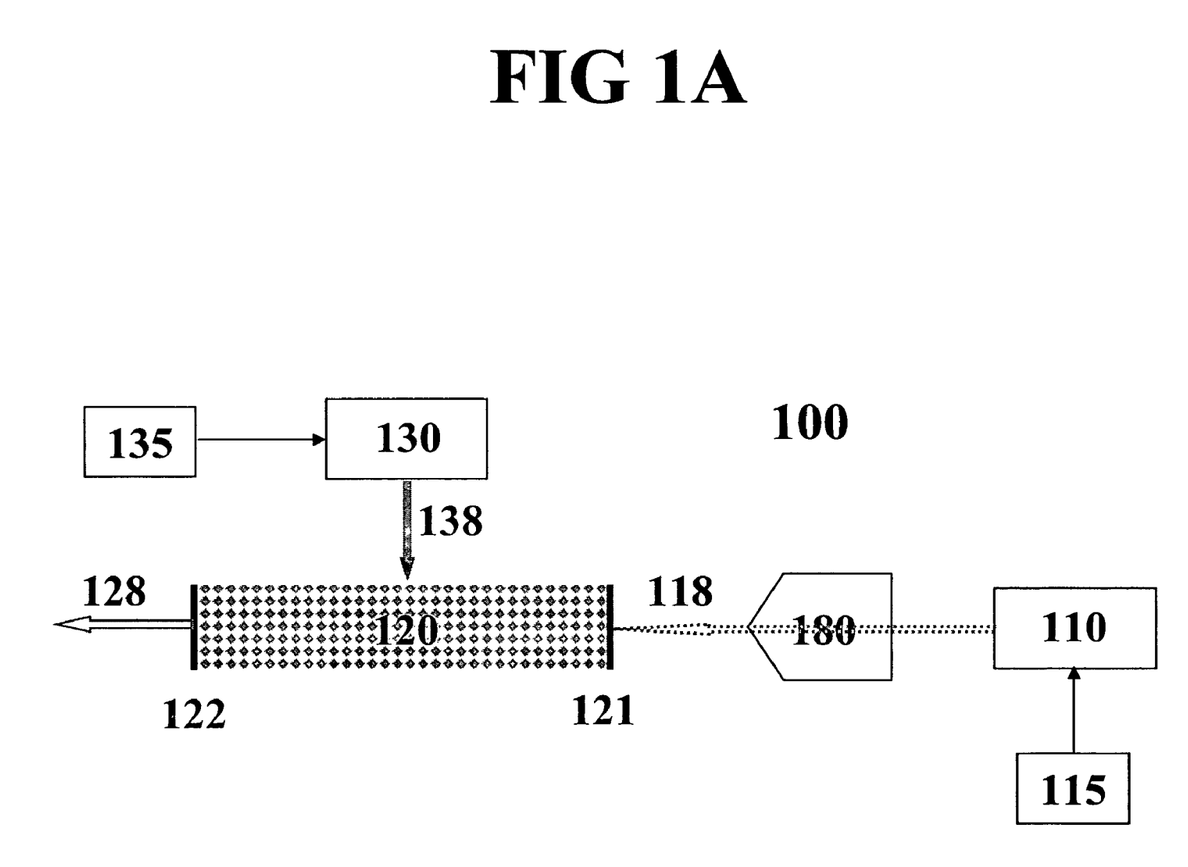
FIG. 1A is a block diagram of master-slave laser configuration according to an embodiment of the present invention.

Referring to drawings and in particular to FIG. 1A, wherein a conceptual illustration of a master-slave laser system constructed according to the present invention is given in form of block diagram. In particular, the master-slave laser system 100 is composed of a seed laser 110 as the master, a seeded laser 120 as the slave, and a pump source 130 energized by 135. The slave cavity is monolithic, namely, the cavity mirrors 121 and 122 are direct coatings on the laser gain medium. These cavity mirrors can be flat or concave or a combination thereof to form certain types of the cavity that meet the requirements of various applications. One or more optical isolator(s) 180 are generally required to protect the seeder from interference or damage due to the slave laser output. There are no moving parts in the injection seeding system.

According to the present invention, the seed laser 110 is a laser diode, which is energized by a driving circuit 115 with RF modulation. As the drive current varies, the wavelength of the light 118 emitted from the seed laser 110 changes, which results in a continuous wavelength sweeping spectrum. As can be appreciated by those skilled in the art, the seed laser is not restricted to laser diode. It can be other light sources producing continuous wavelength sweeping over a range covering one or more longitudinal modes of the slave laser.

On the other hand, the slave laser 120 is energized by pumping light 138 so that population inversion is created. Generated by the pump source 130, the pumping light 138 can be continuous wave or a series of pulses and can be injected into the slave laser gain medium via end or via side. For effective seeding, the seeds 118 should be injected into 120 on or before arrival of the pump pulses 138, although in some cases, the seeds may be introduced somewhat after the gain become positive. If the injection seeding beam is CW or quasi-CW or pulsed at a high repetition rate and/or high duty cycle, which can be generated by the RF modulated laser diode according to the present invention, timing synchronization is not required.

In end-pumping configuration, the pump source 130 can be one or more laser diode(s) or other light sources including diode pumped solid-state lasers with or without harmonic frequency conversion or frequency mixing. In side-pumping configuration, the pump source 130 can be flash lamps, arc lamps, laser diode arrays, LED arrays, or VCSEL arrays, together with a reflecting chamber preferably a diffusion pump chamber for enhancing the absorption efficiency and uniformity. Employing LED or VCSEL arrays as optical pump sources was disclosed in United States Patent Application No. 20050201442, entitled "Solid-State Lasers Employing Incoherent Monochromatic Pump" and in United States Patent Application No. 20060245460, entitled "Vertical Cavity Surface Emitting Laser (VCSEL) Arrays Pumped Solid-State Lasers". These incoherent or partially coherent monochromatic pump sources enable achievement of short pulse and high repetition rate laser operation via Q-switching or gain switching.

Advantageously, the seeded slave laser 120 can have a standing wave cavity or a traveling wave cavity and can be left as-is. There is no need for any structural modifications or adaptations. Still advantageously, the seeded slave laser 120 can be an ordinary optical oscillator or other devices such as OPO, MOPA, MOPO, fiber laser or Raman laser. The optical seeds are injected into the slave laser cavity through free space or optic fiber, via the front mirror (output coupler 122) or the back mirror with high reflectivity (121).

Depending on the number of longitudinal modes covered by the seed wavelength sweeping spectrum, the laser output from the slave 120 can be multimode or single mode. In addition, the purified spectrum can be stabilized at a desired wavelength and the bandwidth can vary to meet the requirements and preference for various applications.

It should be noted that the slave laser gain medium can be in form of gas including ionic species and excimer or liquid including dye or solid-state including solid-state dye, semiconductor, and optic fiber; and the population inversion in the slave gain medium can be created electrically or optically, depending on the characteristics of the gain medium.

Figure 1B:
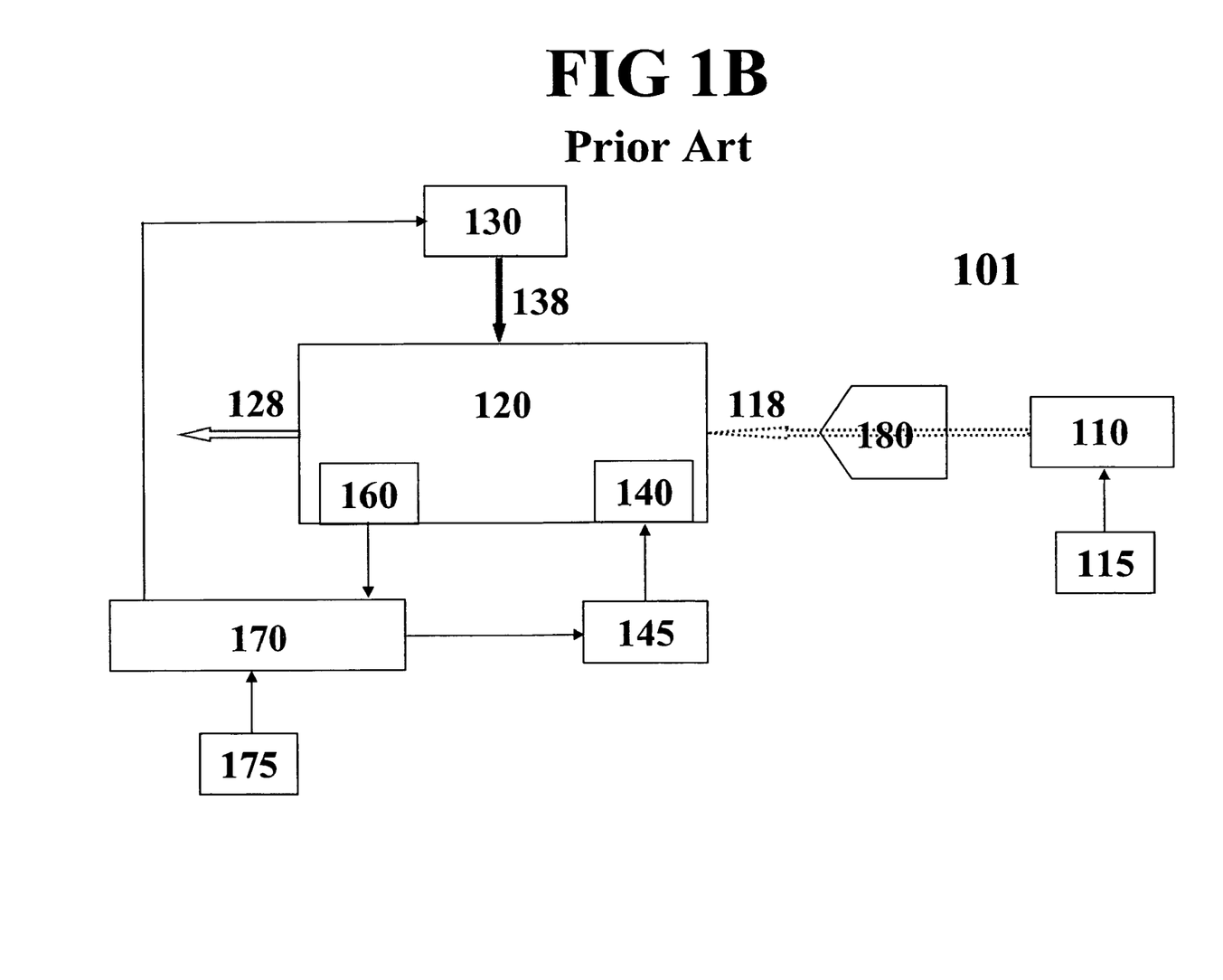
FIG. 1B is a block diagram of conventional master-slave laser configuration (prior art)

For comparison, a block diagram of conventional injection-seeding system is shown in FIG. 1B. A mirror-mounted piezoelectric translator (PZT) or a magneto-electric device 140 is for active control of the cavity length of the slave laser 120. Prior to actuating the pump source 130, a voltage ramp is applied to 140. A photodiode 160 converts the received optical signal to electrical signal, which provides the input to the ramp and lock control electronics 170 for accurate measurement of the relative frequency of the two laser resonators. The ramp and lock control electronics 170 is controlled by a master clock 175. The photodiode 160 monitoring the seed beam circulating in the slave cavity detects fringes in time. Each new fringe corresponds to an increment of the slave cavity length by one half the seed laser wavelength. When the cavity length equals an integer multiple of the half injected seed wavelength, the detected signal moves through a maximum, and cavity resonance with injected wavelength is achieved. On the other hand, a minimum in the detected signal indicates an off resonance condition.

The signal from the photodiode is amplified in high-voltage operational amplifier 145 and passes through a sample and hold circuit. During the ramp phase, a minimum and maximum level detector, which determines the fringe peak height and depth, monitors this signal. A potentiometer is used to vary the locking set-point as a fraction of the difference between these levels. During the lock phase of the cycle, the photodiode signal is summed with an inverted lock set-point value, giving the difference between the actual and desired voltages on the photodiode as the control loop error signal. A variable gain proportional-integral control loop varies the voltage applied to the PZT stack to null this error signal. Following the laser firing, the cavity operates without locking until a predefined amount of time prior to the laser firing again. The unlocked region continues until the next ramp is initiated and the whole process is repeated. Compared to the configuration shown in FIG. 1A, the conventional injection-seeding system is much more complicated. In addition, monolithic structure of the slave laser is impossible.

Figure 2:
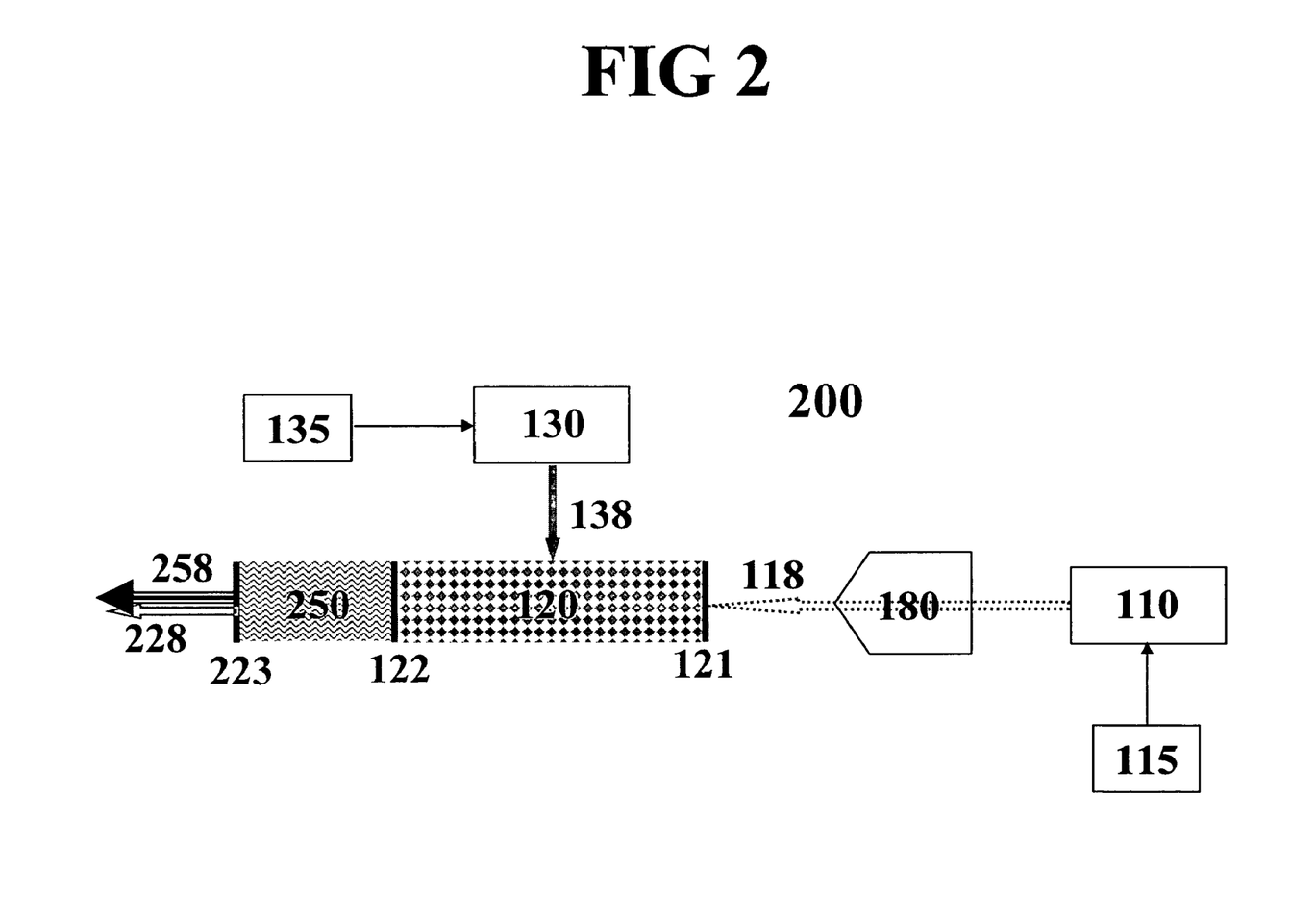
FIG. 2 is a block diagram of master-slave laser configuration with nonlinear frequency conversion according to an embodiment of the present invention.

Now return to description of our inventive teachings. By adding one or more nonlinear optical crystal(s), our inventive system can be applied to production of various wavelengths, in a range spanning from UV to IR. A schematic of such configurations is shown in FIG. 2, wherein the nonlinear optical crystal(s) 250 is optically bonded onto the slave gain medium 120 for nonlinear optical process, which can be harmonic generation or optical parametric generation. The coating 122 is highly transparent to the seeding wavelength 118 and is highly reflective to the wavelength 258 that is a conversion from the fundamental wavelength 228 through the nonlinear optical process, while the mirror 223 is highly transparent to the converted wavelength 258. Advantageously, the mirror 223 can be highly reflective to the fundamental wavelength 228 or highly transparent to it. In the latter case, dual wavelength laser output can be obtained. Still advantageously, the end mirrors 121 and 223 can be flat or curved with certain radius of curvature or a combination of them depending on the needs.

In addition to linear cavities, our inventive teachings can also be applied to folded cavities and ring cavities. When a traveling wave ring resonator is injection-seeded, there is little or no optical feedback from the high-power slave into the low-power master. This attribute improves the laser stability and reduces the requirements for optical isolation. A ring cavity typically comprises at least three reflective mirrors (surfaces), each of which must be properly aligned for effective operation. In operation, the intracavity light path forms a polygon (ring), which can be two-dimensional (planar) or three-dimensional (non-planar). A monolithic ring laser consists of a single piece of material (laser gain medium) or several materials optically bonded each other to form a monolithic block. All mirrors are part of the monolithic block, no alignment is needed. The monolithic structure eliminates relative motion of resonator mirrors due to mechanical instability caused by events such as movement of the laser, and consequently improves frequency stability.

Conventional laser cavities, whether in linear or ring configurations, normally support counter-propagating oscillations, which may result in spatial hole-burning. The fundamental requirement for unidirectional oscillation in ring cavities is an adequate loss difference between the two opposite directions of propagation around the ring. A magneto-optic element, which shows circular birefringence in the presence of an applied magnetic field, is characterized by non-reciprocal effect such as the Faraday effect, whereby the polarization rotation induced by the magnetic field is independent of the propagation direction, in which the light is traveling. Non-reciprocal effect has been utilized to make unidirectional ring lasers. In order to obtain unidirectional operation, the ring must also include a means for generating a reciprocal polarization rotation, which can be conventionally achieved by an optically active rotator or a linear birefringent wave-plate of suitable phase retardation or a non-planar ring geometry, and a means for providing polarization discrimination, which can be created with an optical element inclined at Brewster's angle or an optically coated output coupler inclined at an oblique angle with the incident light.

One prior art approach to monolithic ring laser was disclosed in U.S. Pat. No. 4,578,793. With a magnetic field present in certain direction, the laser gain medium itself serves as the Faraday rotator, the out-of-plane total internal reflection bounces serve as the half-wave plate, and the non-normal incidence of the internal ray path at dielectrically coated output coupler serves as a partial polarizer: the light incident on the output coupler face is inclined at an oblique angle and the output coupler face is optically coated to provide polarization discrimination. Non-planar monolithic ring lasers with four or five or six bounces were described in U.S. Pat. No. 5,027,367. Such monolithic non-planar ring lasers, however, demand adherence to strict dimensional and angular fabrication tolerances and require numerous fabrication steps.

A planar unidirectional solid-state ring laser, as disclosed by Scerbak in U.S. Pat. No. 4,955,034, consists of a non-birefringent (isotropic or cubic) material. Reciprocal polarization rotation along a lasing path within the material is realized by applying a mechanical stress that causes relative phase shifts or by modifying the material to change the index of refraction along the lasing path. Non-reciprocal polarization rotation is provided by the Faraday effect.

Other geometries of ring cavities are also possible. For example, U.S. Pat. No. 6,282,226 described a ring cavity laser, which has a polyhedral structure contoured by a plurality of planes. The polyhedral structure can be a tetrahedron, which can be fabricated by a selective growth on a crystalline substrate having a principal plane of a prescribed face or by selectively etching a substrate having a principal plane of face-orientation dependence.

One primary advantage of a ring laser is that traveling wave operation can yield single frequency performance. Because of this advantage, in the prior art, monolithic ring lasers are often employed as seed sources. Our inventive teachings, which eliminate the need for active control of the slave laser cavity, enable seeded (slave) lasers with monolithic ring cavities.

Figure 3A:
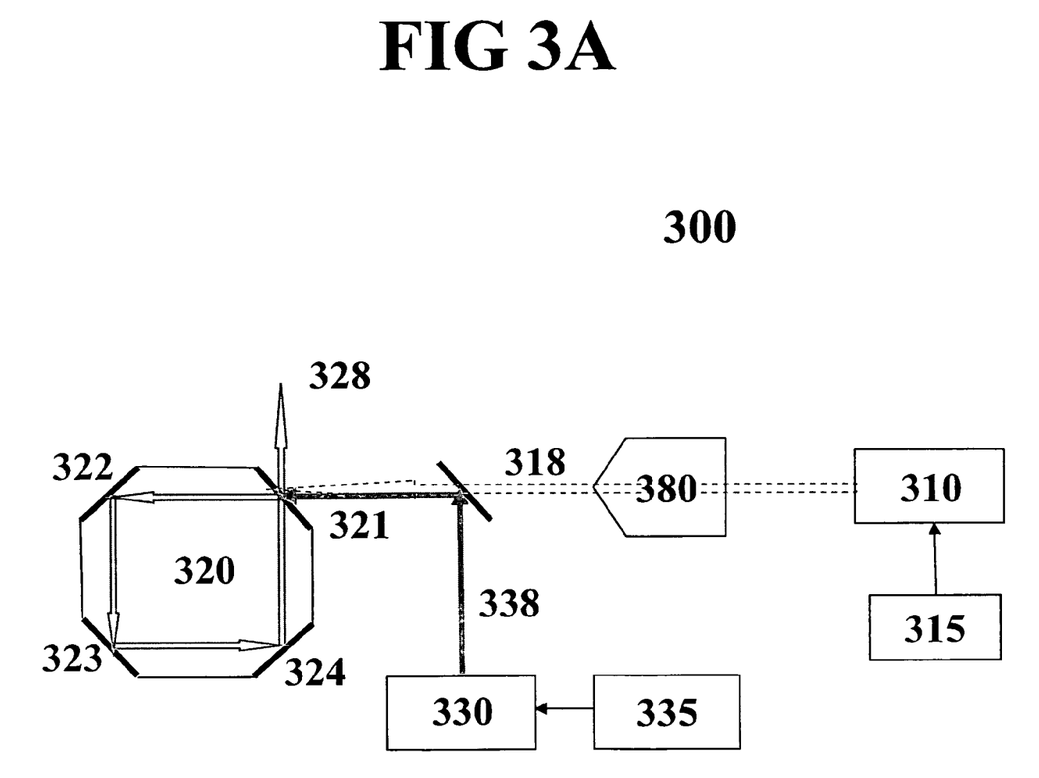
FIG. 3A is a schematic of an inventive injection-seeding system wherein the slave laser has a monolithic ring cavity.

A preferred configuration of monolithic ring cavity of slave lasers is schematically shown in FIG. 3A, wherein the three faces 322, 323, and 324 of laser material 320 provide for total internal reflection to generate reciprocal polarization rotation and to guide the laser light about a closed loop, which can be two-dimensional or three-dimensional, depending on the specific design. The surface 321 acts as both the input (injection seeding 318 and pump light 338) and output (laser output 328) coupler. One or more optical isolator(s) 380 are placed in the path of the seeding beam 318 to protect the seeder 310 from interference or damage due to undesired optical feedback.

It should be pointed out that the configuration shown in FIG. 3A is for conceptual and exemplary illustration only. There may be many alternative configurations without departure from the principle of our inventive teachings. For example, the geometry of the laser material 320 can vary vastly and the number of the total internal reflection faces can be any integer greater than one for reciprocal polarization rotation. These faces can be flat or curved with a desired radius of curvature. Depending on the shape and size of the laser material 320 and its index of refraction, the incident angle of the light relative to each reflection face, and the phase shift amount occurring at the time of reflection on each face, the light path formed in the ring cavity can have various patterns. Moreover, there may be several different input couplers for the seeding beam 318 and the pump light 338. In particular, optical pumping can be accomplished through several faces by multiple pump sources in a cascade manner. These faces are dielectrically coated to be highly reflective at the internal lasing wavelength and highly transmissive to the pump wavelength and polarization at the appropriate angle determined by Snell's Law. In addition, the output coupler, which extracts the laser output 328, may or may not share with an input coupler. In fact, any ring laser cavities disclosed in the prior art can be selected, according to the present invention, as the slave laser.

For some applications, the ring cavity can be a composite cavity, namely, the solid-state block 320 is composed of laser gain medium and other components such as micro-lens arrays, un-doped host material(s), nonlinear optical crystal(s), birefringent crystal(s), and Q-switch devices. The laser gain medium can be selected from a large group, whether isotropic or naturally birefringent. When the laser material 320 is immersed in an applied magnetic field for non-reciprocal polarization rotation, the laser beam 328 inside the ring cavity travels unidirectional. Of course, as a slave laser, unidirectional propagation of laser light within the ring cavity is generally not necessary, even for a single longitudinal mode operation. This further simplifies the injection seeding system.

Figure 3B:
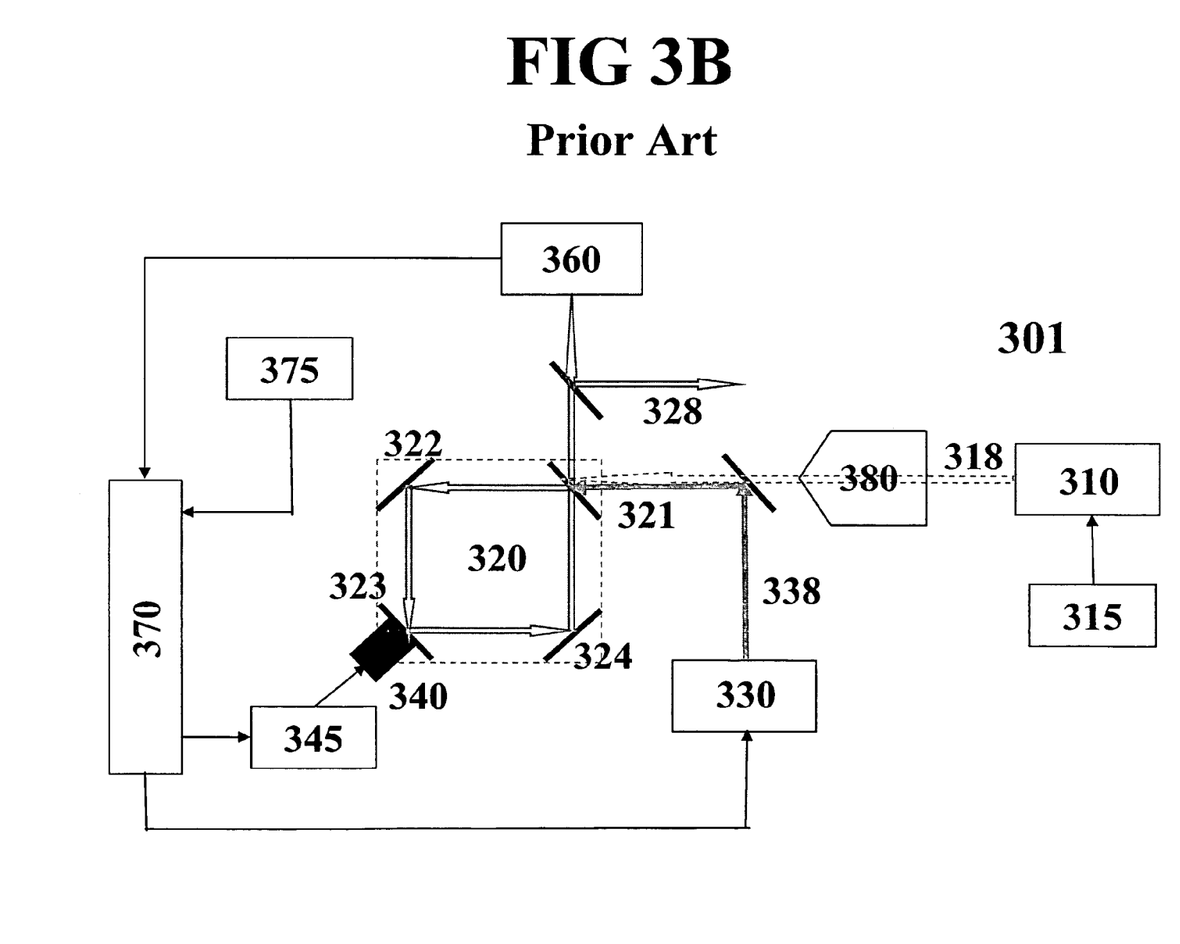
FIG. 3B is a schematic of a conventional injection-seeded solid-state ring laser (prior art)

For comparison, a schematic drawing of a conventional injection-seeding system wherein the slave oscillator has a non-monolithic ring configuration is shown in FIG. 3B. A PZT 340 is mounted on a highly reflective mirror 323 for active control of the cavity length of the slave laser 320. A photodiode 360 detects the master-slave resonance and, depending on the detection results, provides a feedback signal to the control electronics 370 and 345. Time synchronization between the seed beam 318 emitted from the seeder 310 and the pump pulse 338 generated from the pump source 330 is governed by the master clock 375 and the control electronics 370.

Figure 4A:
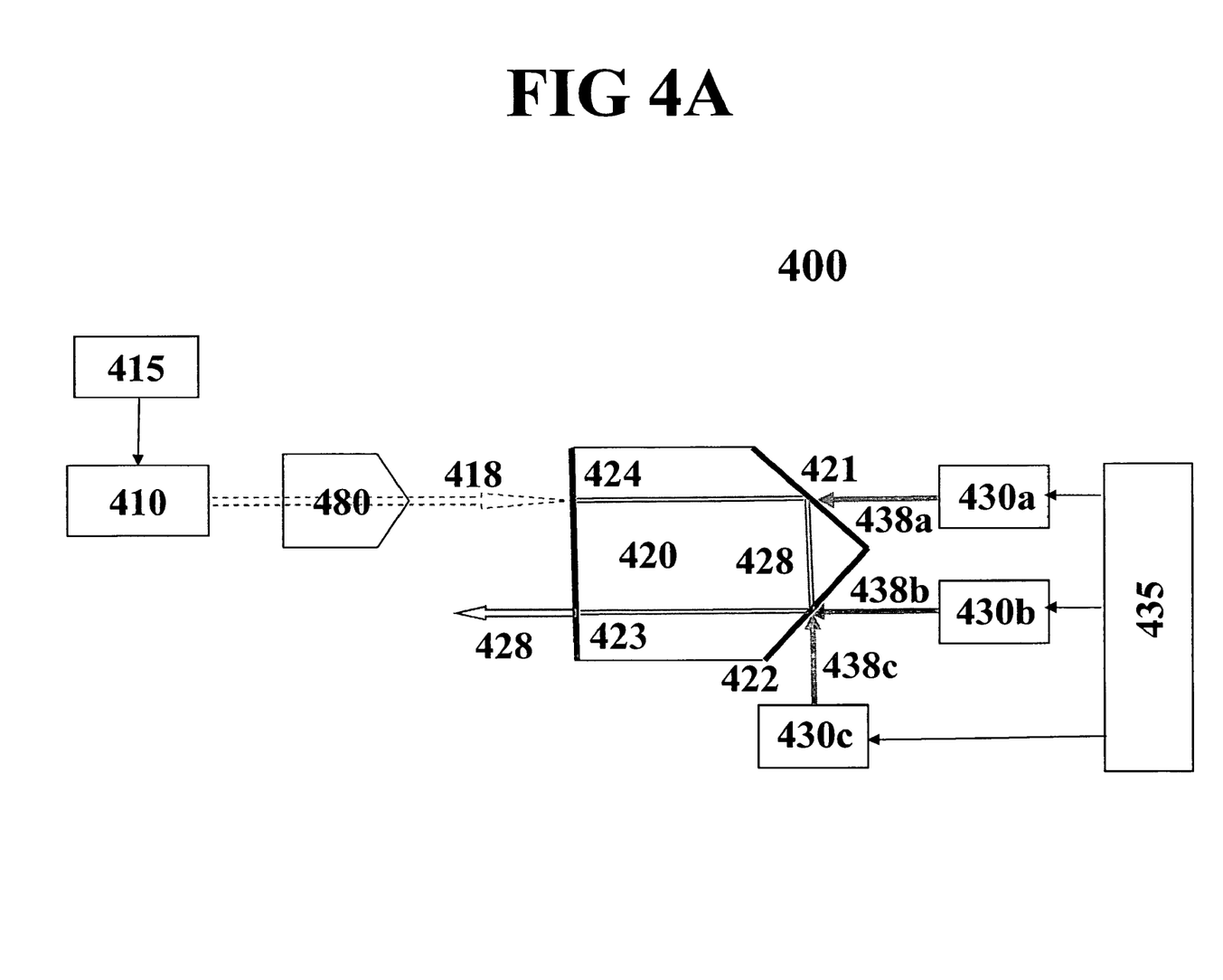
FIG. 4A is a schematic of an inventive injection-seeding system wherein the slave laser has a monolithic folded cavity.

An embodiment of an injection-seeding system with monolithic folded cavity of slave laser is schematically shown in FIG. 4A. In this embodiment, the laser gain medium 420 is dielectrically coated, wherein the mirror 424, which serves as an input coupler of the seed beam 418, is highly reflective to the wavelength and polarization of the laser beam 428, the mirror 423 serves as an output coupler of the laser beam 428, and the mirrors 421 and 422 are highly reflective to the wavelength, polarization, and incident angle of the laser beam 428 while anti-reflective to the wavelength, polarization, and incident angle of the pump beams 438a, 438b, and 438c. The seed beam entrance and the laser beam exit occur on the same surface of the slave laser 420 but are spatially displaced at different locations, which enables simple means to separate the slave laser beam 428 from the seed beam 418.

Figure 4B:
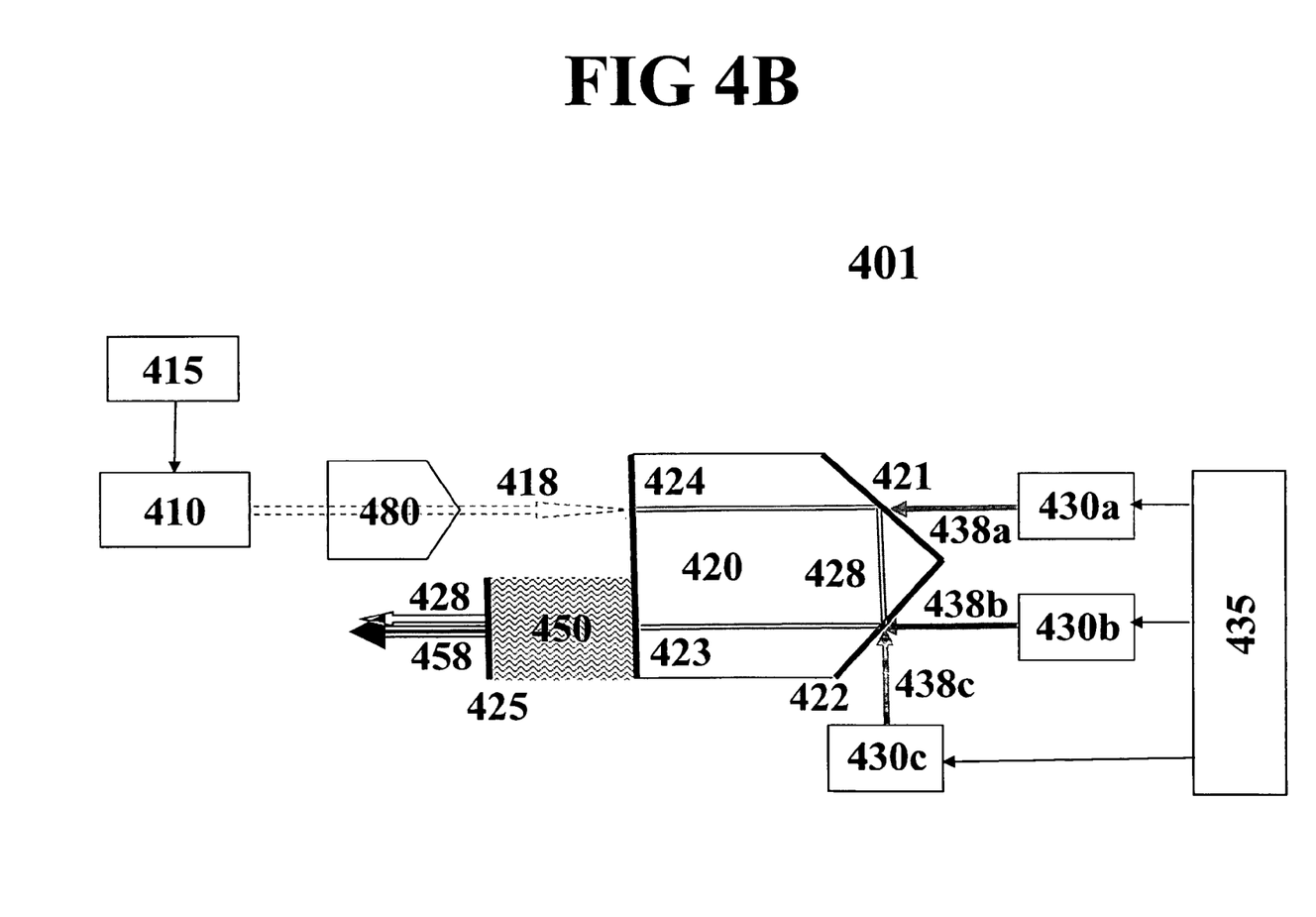
FIG. 4B is a schematic of an inventive injection-seeding system wherein the slave laser has a monolithic folded cavity with nonlinear frequency conversion.

By introducing one or more nonlinear optical processes for frequency conversion, a variety of laser frequencies, ranging from IR through visible to UV, can be achieved from the inventive injection-seeding system. An exemplary configuration is schematically shown in FIG. 4B, wherein one or more nonlinear optical crystal(s) 450 are optically bonded onto the laser gain medium 420. Advantageously, the nonlinear optical processes can be harmonic generation, OPO, or a combination thereof. In addition, other optical elements such as a Q-switch device can be optically bonded onto the monolithic slave oscillator to meet the specifications and requirements of a particular application. One of the turn angles (either 421 or 422) should be coated with polarized high reflection if the nonlinear optical processes and/or Q-switching in 450 are polarization dependent. In the embodiment described in FIG. 4B, the coating 423 is highly transmissive to the fundamental wavelength 428 and is highly reflective to the converted wavelength 458. The mirror 425 is highly transmissive to 458. If the mirror 425 is highly reflective to 428, the nonlinear optical process in 450 is resonant. On the other hand, if the mirror 425 is highly transmissive to 428, dual color laser output can be obtained.

There may be many alternative embodiments. For example, in FIG. 4A, instead of injecting seeds through the highly reflective back mirror 424, an alternative approach is to injecting seeds through the highly transmissive front mirror 423. Optical pumping may be achieved by one or more light sources such as laser diode(s) with the emission spectrum matching the absorption characteristics of the gain medium. The pump beam(s) can enter the gain medium through one or more faces, whether shared with the seed beam 418 and/or the output beam 428. With proper modifications, optical pumping can be provided by a side-configuration.

It should be noted that the slave laser crystals, which form ring cavities or folded cavities as illustrated in FIGS. 3A, 4A, and 4B, may have a variety of geometries. The embodiments described therein are for explanation only and by no means a limitation.

Figure 5A:
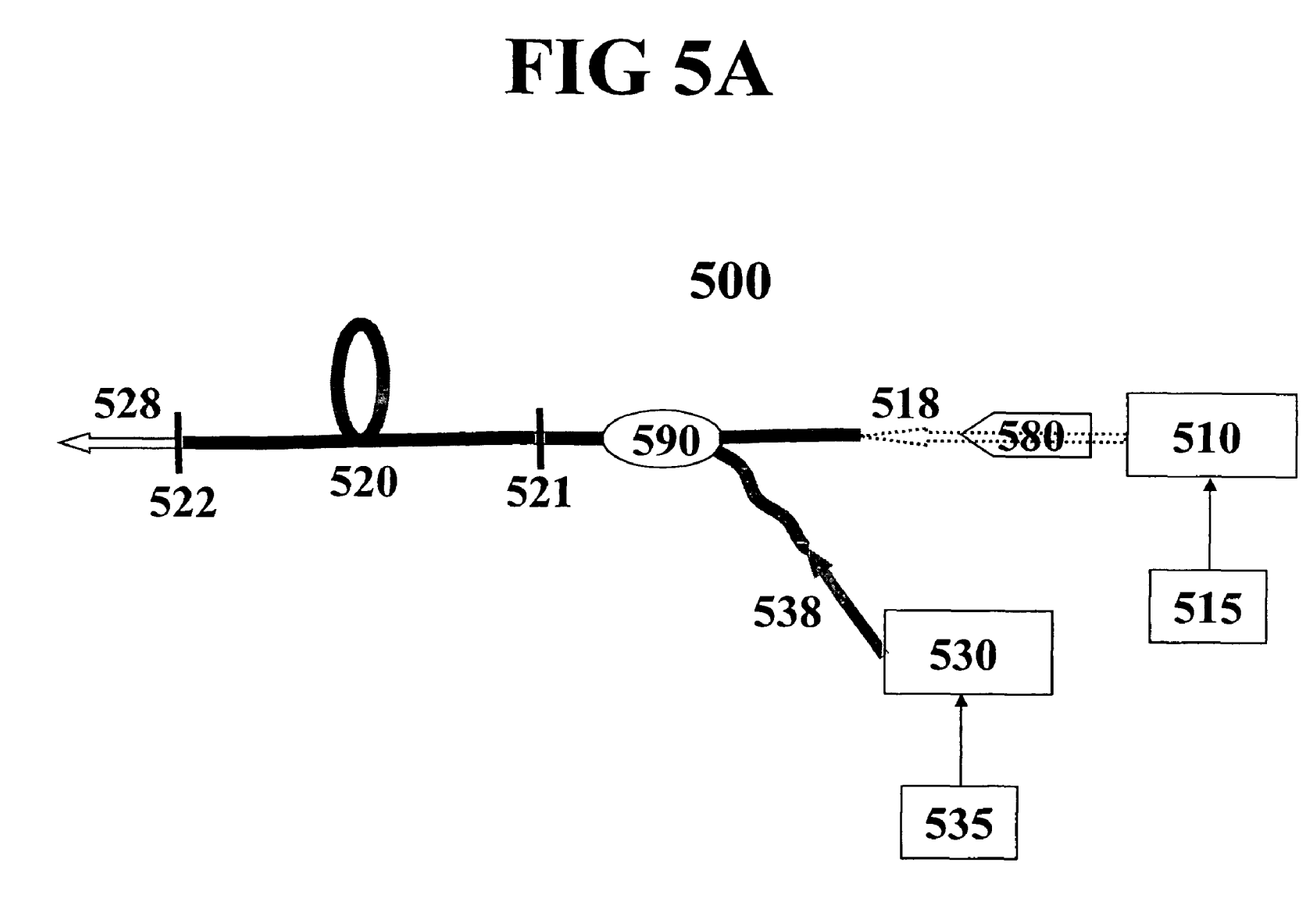
FIG. 5A is a schematic of a monolithic fiber laser injection-seeded by a light source according to an embodiment of the present invention.

Our inventive teachings are also applicable to monolithic fiber lasers including fiber ring lasers and fiber optical parametric oscillators. With reference to FIG. 5A, wherein an injection-seeding system 500 comprising a seeder 510 constructed in accordance with the present invention, a fiber slave oscillator 520, and a pump assembly 530 is shown in a schematic form. At the center of the slave oscillator 520 is a rare-earth-ions-doped gain medium, typically within a double-clad fiber consisting of a high-NA outer waveguide and a low-NA central core waveguide. Two cavity mirrors, the back mirror 521, which is highly reflective to the wavelength of the laser beam 528, and the output coupler 522, which is partially reflective to the laser wavelength, are in-core fiber Bragg gratings or dielectric mirrors directly butted to the two ends of the optic fiber. This configuration differentiates from the prior art, wherein a slave fiber laser typically requires a mechanism such as a SESAM-lens assembly or a PZT actuator to actively adjust the cavity length, which consists of a free space section and a fiber section (non-monolithic). In addition, the master-slave synchronization is required in the prior art.

In operation, the seeder 510 injects optical seeds 518 into the slave oscillator 520 through the back mirror 521, as shown in this FIG. 5A, or, as an alternative configuration, through the output coupler 522. Similarly, the pump beam 538 can enter the slave oscillator 520 through either or both of the end mirrors 521 and 522. One or more monochromatic and/or dichroic fiber combiner(s) and/or splitter(s) can be employed as input/output coupler(s). For explanation, in this FIG. 5A, the seed beam 518 and one or more pump beam(s) 538 are injected into the slave laser 520 through an input coupler 590, which can be a fused fiber coupler. Between the seeder 510 and the seeded laser 520 are one or more optical isolator(s) 580, which can be free-space isolators or fiber optic isolators. The pump beam 538 and the seed beam 518 can be injected into the gain medium of the slave laser 520 through free space or optic fiber coupling. If both the pump source 530 and the seeder 510 are pigtailed laser diodes and the isolator(s) 580 are fiber optic isolators, all these components can be fiber-to-fiber connected.

When a high-power pump beam 538 is launched into the outer waveguide of the slave fiber laser 520 and is absorbed by the doped inner core, the required population inversion and hence the gain is created. Initiated by the injected seeds, lasing occurs along the inner core, which largely defines the laser transverse modal structure and the resulting beam quality. Optimum fiber lengths depend on the pump wavelength, doping level, and the overlap between the doped core region and the outer pump waveguide. Again, the description of the inventive embodiments is by way of example.

Figure 5B:
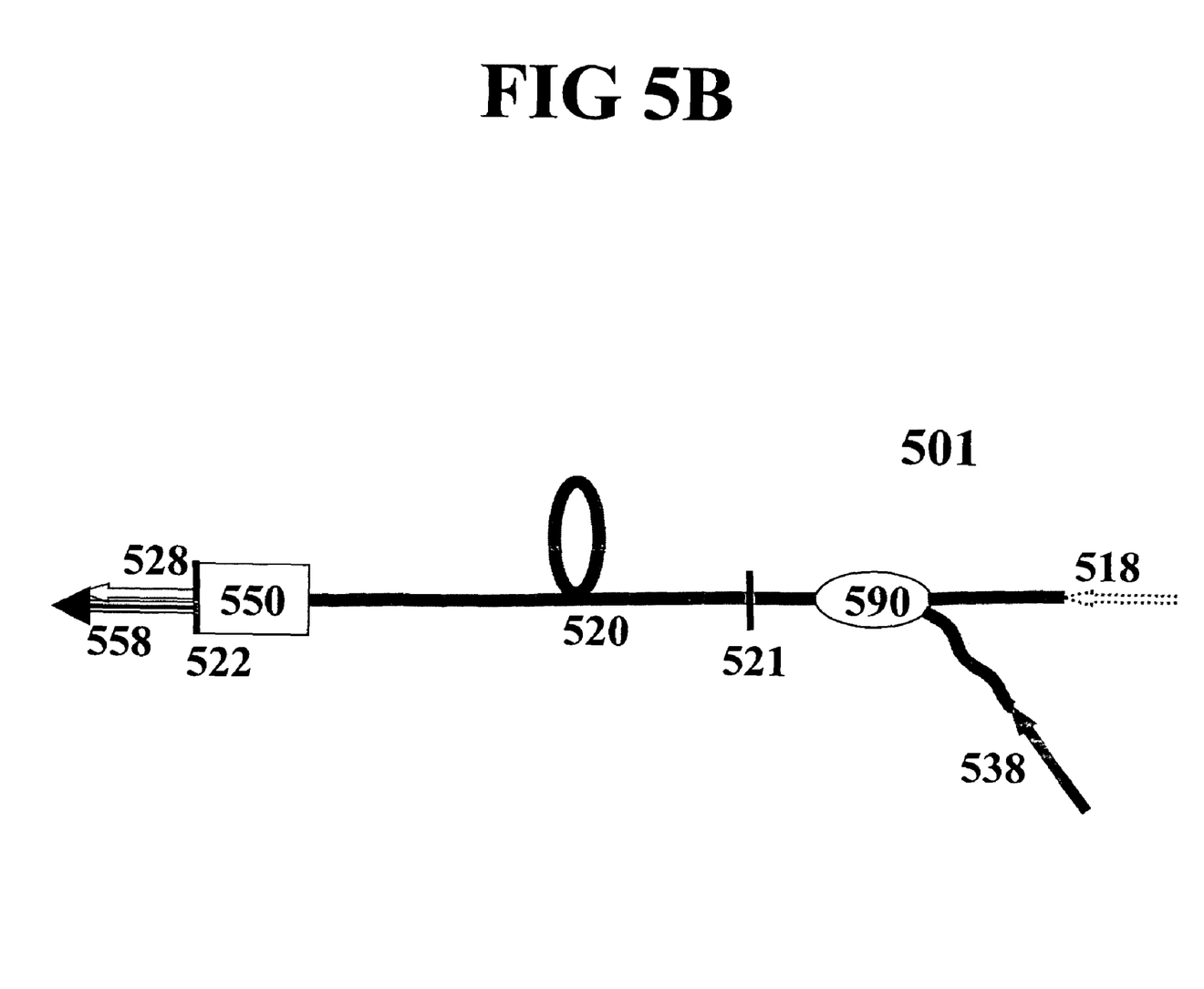
FIG. 5B is a schematic of a monolithic fiber laser with nonlinear frequency conversion, injection-seeded by a light source according to an embodiment of the present invention.

According to our inventive teachings, one or more optical elements such as periodically poled materials, fiber-based nonlinear wavelength converters, and/or Q-switch devices can be optically connected, through free space or fiber, to the injection-seeding system 500 illustrated in FIG. 5A. For example, FIG. 5B shows an injection-seeding system 501, in which a nonlinear optical device 550 is connected to the output coupler 522 for (intracavity) harmonic generation or optical parametric generation. If the output coupler 522 is dichroically coated, dual-color laser output 528 and 558 can be obtained.

In CW operation, optical-to-optical efficiency of nearly 80% can be achieved in a fiber laser by keeping pump light and signal light in a fiber core where diffraction loss and reflection from bulk intracavity elements are absent. In pulsed operation, however, the efficiency of fiber lasers drops significantly due to extra loss in fiber laser cavity that typically uses bulk acousto-optical or electro-optical modulators or nonlinear absorbers such as semiconductor saturable-absorber mirrors (SESAM) to periodically switch the cavity Q-factor and to produce pulse light. Moreover, the lengthy fiber cavity may not offer a sufficient contrast between high- and low-Q factors to prevent the system from generating pre- and/or post-lasing oscillations.

In addition to Q-switching, another conventional approach to pulsed operation of fiber lasers is based on master oscillator power amplifier (MOPA) system. In such an arrangement, the master oscillator provides relatively low power laser radiation pulses having desired characteristics such as spectral width, pulse repetition rate, and pulse length. These pulses are then amplified to high power in one or more fiber amplifier(s). Fiber MOPA systems may suffer instability caused by amplified spontaneous emission (ASE) and, in multistage amplification systems, cross-talk between amplifiers. Suppression of back reflection and isolation between amplifiers are necessary to combat instability in fiber MOPA systems with high gain. Bulk optical elements such as isolators, spectral filters, modulators and the like, or a non-amplifying optical fiber, along which the reflected amplified signal propagates in a forward direction, are thus introduced. All these approaches complicate the systems and reduce operation efficiencies. Alternative means to suppress ASE include saturating the power amplifier with master oscillator, which depletes the upper state. Examples of fiber MOPA systems include U.S. Pat. Nos. 6,031,869, 7,106,501, and US Patent Application No. 20060029111.

Other technological challenges to pulsed operation of fiber lasers include sensitivity of lengthy gain medium to nonlinear effects. The two main nonlinear effects in fiber lasers are Stimulated Brillouin Scattering (SBS) and Stimulated Raman Scattering (SRS). Both effects cause spectral broadening that will saturate the output power level or render the output beam unsuitable for beam combining.

An important application of the present invention is associated with generation of high power laser pulses from a fiber laser in an efficient and cost-effective manner. In particular, it enables short pulse and high repetition rate laser operation via gain switch, which successfully overcomes the shortcomings of the prior-art fiber pulse lasers. When optical seeds 518, as shown in FIGS. 5A and 5B, are injected into the activated slave cavity 520, stimulated emission at the seeder wavelengths dominates immediately. This mechanism significantly shortens the buildup time of laser pulse, which is particularly advantageous to fiber lasers with extremely long cavity. In addition, pulse-to-pulse amplitude jitter is virtually eliminated, enabling laser operations at high pulse-to-pulse repetition rates. Compared to fiber MOPA, the injection seeding system constructed according to the present invention allows for a relatively short fiber cavity to achieve the same level of laser output power. A shorter laser cavity effectively suppresses ASE and reduces undesired SBS and SRS effects.

ASE can be further suppressed by pulse pumping. According to our inventive teachings, time synchronization between the injection seeding and the pump pulses is generally not required. Unlike MOPA systems where the laser output from power amplifier essentially duplicates the shape and duration of the seed pulses, the present invention provides for more flexibility to control the produced laser pulses. For example, the injection seeding can be CW or quasi-CW or pulsed with radio frequency. In some applications, the seeder with continuous wavelength sweeping spectrum is intensity-modulated by a waveform that matches the special needs.

Figure 6:
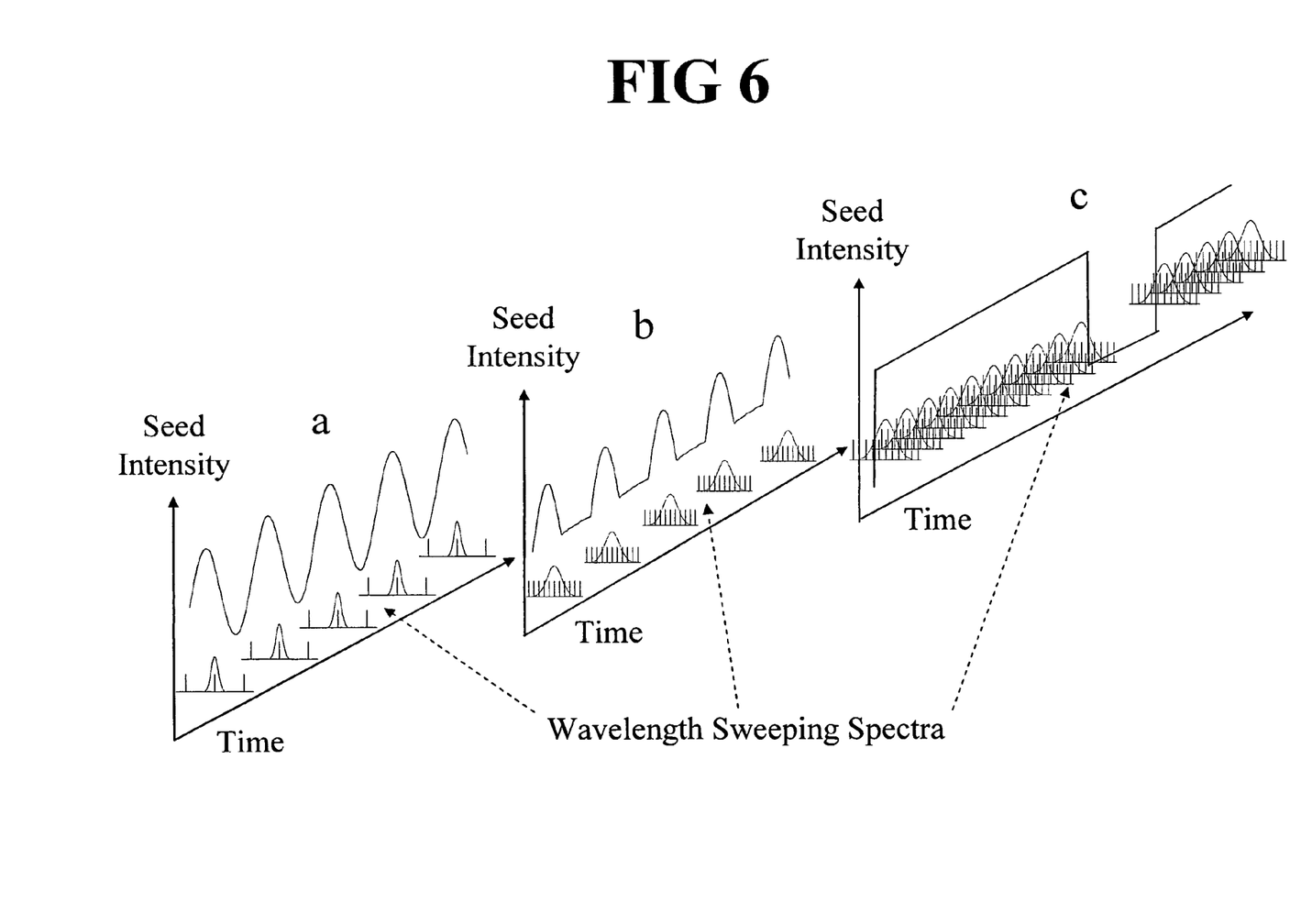
FIG. 6 shows optical waveforms of the inventive seeder operated in various modes: (a) CW and SLM, (b) pulsed and multimode, (c) multimode and intensity-modulated.

FIG. 6 shows optical waveforms of the inventive seeder operated in a variety of modes. By adjusting the degree of RF modulation, the laser beam from the seeder can be in single longitudinal mode or multimode, combined with a temporal mode, which can be CW (a), pulsed (b), or intensity-modulated (c). With reference to FIG. 6 (c), the wavelength-swept seed light is optically or electronically modulated by a waveform with such characteristics that the requirements of a special application can be met. Although in this particular FIG. 6 (c), the waveform is square-shaped, this is by no means a limitation. In fact, any other waveforms can be used. All these modes and temporal waveforms can be applied to monolithic slave lasers described in the forgoing text.

The fiber laser can be end-pumped or side-pumped. End-pumping injects optical pump power into the fiber through at most two input ends, which physically constrains the type and number of the pump sources that are able to be used. A preferred configuration uses a bundle of multimode pump delivery fibers that are fused together to form an input coupler. In the prior art, side-pumping injects optical pump power into the fiber typically through wavelength division multiplexing (WDM) couplers, V-grooves that are cut into the cladding of dual clad doped fiber, a prism or tapered wedge that is precisely located against an exposed cladding interface, a grating formed on the longitudinal surface of a multimode fiber with removed outer cladding, a total internal reflection (TIR) coupler, or coupling surfaces along the length of a fiber laser that is bent into a coil having a moderate curvature. These coupling schemes are representatively disclosed in U.S. Pat. Nos. 5,119,452, 5,854,865, 6,243,515, 6,529,318, 6,842,570, and 6,975,791. In addition to laser diodes or laser diode arrays, which are commonly employed in the prior art for side-pumping of fiber lasers, other devices that are able to be used as light sources include LED arrays and VCSEL arrays. Compared to laser diode arrays, LED arrays or VCSEL arrays are much less expensive pump sources with much more available wavelengths and the ability to scale up the peak power at short pulse widths.

What is claimed is:

1. An injection-seeding laser system comprising:
   a seeder (master) to produce optical seeds;
   a seeded (slave) laser oscillator with a monolithic cavity, wherein:
   the laser gain medium, the cavity mirrors and other associated optical elements of the slave laser cavity are all embodied in a single block, there is no free-space section in the cavity and there are no moving parts involved;
   one or more free-space optical isolator(s) or fiber optic isolator(s) or a combination thereof;
   one or more input coupler(s), either free-space or optic fiber, through which the optical seeds are injected into the slave laser gain medium; and
   one or more output coupler(s);
   wherein said seeder emits light with wavelength continuously sweeping in a radio frequency (RF) over a range that covers one or more longitudinal mode(s) of the seeded (slave) laser
   wherein the gain medium of said slave laser oscillator is an optic fiber, the cavity mirrors are in-core fiber Bragg gratings, dielectric mirrors directly butted to one or more end(s) of the optic fiber, or a combination thereof;
   wherein the fiber gain medium is optically excited, the excitation beam is injected into the fiber gain medium through one or more input couplers;
   wherein the input/output coupler(s) are selected from one or more of the following: monochromatic fiber combiner(s), monochromatic fiber splitter(s), dichroic fiber combiner(s), dichroic fiber splitter(s);
   wherein the output coupler is coated to produce a dual color output.

* * * * *